(12) United States Patent
Pan

(10) Patent No.: US 8,407,474 B2
(45) Date of Patent: Mar. 26, 2013

(54) PRE-AUTHENTICATION METHOD, AUTHENTICATION SYSTEM AND AUTHENTICATION APPARATUS

(75) Inventor: Yunbo Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 12/979,085

(22) Filed: Dec. 27, 2010

(65) Prior Publication Data

US 2011/0107099 A1 May 5, 2011

Related U.S. Application Data

(63) Continuation of application No. PCT/CN2009/071572, filed on Apr. 29, 2009.

(30) Foreign Application Priority Data

Jun. 25, 2008 (CN) .......................... 2008 1 0127098

(51) Int. Cl.
*H04L 29/06* (2006.01)
(52) U.S. Cl. ........ 713/169; 713/170; 713/171; 713/172; 713/173; 726/3; 726/4; 726/5; 726/6; 726/7
(58) Field of Classification Search .................... 713/169
See application file for complete search history.

(56) References Cited

U.S. PATENT DOCUMENTS

| 2002/0037708 | A1 | 3/2002 | McCann et al. | |
|---|---|---|---|---|
| 2007/0003062 | A1* | 1/2007 | Mizikovsky et al. | 380/270 |
| 2007/0256120 | A1 | 11/2007 | Shatzkamer et al. | |

FOREIGN PATENT DOCUMENTS

| CN | 1649435 A | 8/2005 |
|---|---|---|
| CN | 101018175 A | 8/2007 |
| CN | 101079891 A | 11/2007 |
| CN | 101094063 A | 12/2007 |
| CN | 101094066 A | 12/2007 |
| CN | 10122319 A | 7/2008 |
| CN | 101616407 B | 4/2011 |
| EP | 1422875 A2 | 5/2004 |
| WO | 2007/056313 A2 | 5/2007 |

OTHER PUBLICATIONS

Extended European Search Report issued in corresponding European Patent Application No. 09768732.1, mailed Aug. 17, 2011.

Written Opinion of the International Searching Authority issued in corresponding PCT Patent Application No. PCT/CN2009/071572, mailed Aug. 6, 2009.

(Continued)

*Primary Examiner* — Longbit Chai

(74) *Attorney, Agent, or Firm* — Brinks Hofer Gilson & Lione

(57) ABSTRACT

A pre-authentication method and an authentication system related to the mobile communications field are disclosed. The pre-authentication method includes: when a mobile node (MN) enters a visited network other than a home network, the MN obtains the identity information of the visited network, selects, according to the identity information of the visited network, a first pre-auth-key-file corresponding to the visited network and a first ticket corresponding to the visited network, where the first ticket carries the first pre-auth-key-file, and authenticates the visited authentication, authorization and accounting (VAAA) server according to the first pre-auth-key-file.

7 Claims, 7 Drawing Sheets

OTHER PUBLICATIONS

Bargh et al., "Fast Authentication Methods for Handovers between IEEE 802.11 Wireless LANs", Proceedings of the $2^{nd}$ ACM International Workshop on Wireless Mobile Applications and Services on WLAN Hotspots. Oct. 1, 2004. XP 002461773.

International Search Report issued in corresponding PCT Application No. PCT/CN2009/071572; mailed Aug. 6, 2009.

Dutta et al., "Media-Independent Pre-Authentication (MPA) Implementation Results" MOBOPTS Research Group, Jul. 8, 2007.

Narayanan et al., "EAP Extensions for EAP Re-Authentication Protocol (ERP)" Network Working Group, Mar. 29, 2008.

Ohba, "Pre-authentication Support for PANA" PANA Working Group, Mar. 3, 2006.

Ohba (Ed.), EAP Pre-authentication Problem Statement Network Working Group, Sep. 6, 2007.

Ohba (Ed.), EAP Pre-authentication Problem Statement Network Working Group, Oct. 18, 2007.

Ohba (Ed.), EAP Pre-authentication Problem Statement Network Working Group, Feb. 22, 2008.

Ohba (Ed.), EAP Pre-authentication Problem Statement Network Working Group, Jun. 4, 2008.

Office Action issued in corresponding European Patent Application No. 09768732.1, mailed Jun. 22, 2012.

* cited by examiner

PRE-AUTHENTICATION METHOD, AUTHENTICATION SYSTEM AND AUTHENTICATION APPARATUS

CROSS-REFERENCE TO RELATED APPLICATIONS

This application is a continuation of International Application No. PCT/CN2009/071572, filed on Apr. 29, 2009, which claims priority to Chinese Patent Application No. 200810127098.1, filed on Jun. 25, 2008, both of which are hereby incorporated by reference in their entireties.

FIELD OF THE APPLICATION

The present application relates to the mobile communications field, and in particular, to a pre-authentication method, an authentication system, and an authentication apparatus.

BACKGROUND OF THE APPLICATION

With the development of communications technologies, modern communications impose higher requirements for mobile communications. In current mobile communications, a mobile node (MN) should be able to carry out normal communications in a mobile or a roaming scenario.

In the mobile scenario, inevitably, the MN hands over, that is, the network attachment point of the MN changes with the movement of the MN. The handover may be categorized into Layer 2 handover and Layer 3 handover according to the relative position of the network attachment point before and after the handover. Layer 3 handover may be further categorized into intra-domain handover (that is, the old network attachment point and the new network attachment point are in the same jurisdiction of an authentication, authorization and accounting (AAA) server) and inter-domain handover (that is, the old network attachment point and the new network attachment point are in different jurisdictions of the AAA server). A complete Layer 3 handover process includes the following steps: 1. The MN leaves the old network attachment point and hands over to a new network attachment point to perform new network access authentication; 2. The MN establishes a corresponding configuration relationship on the new network attachment point.

It takes a certain time for the MN to hand over from the old network attachment point to the new network attachment point. During this period of time, the communication may be interrupted or delayed. For some services with high real-time requirements (for example, instant messaging service), this interruption or delay is desired to be as short as possible. However, in actual applications, the current authentication method requires multiple rounds of interactions between the MN and the AAA server. In addition, when the MN is roaming, the MN still needs to be authenticated on the home network. Thus, the new network access authentication takes a long time, so that the interruption or delay during the handover exceeds the upper limit of the instant messaging service.

In the prior art, a fast re-authentication method is adopted to reduce the interruption or delay. By using the fast re-authentication method, the authorization or configuration information generated in the previous authentication is inherited during the mutual authentication. Because the authorization and configuration information does not need to be re-generated, the fast re-authentication method needs fewer interactions and less processing than the ordinary authentication method, thus saving the authentication time. The fast re-authentication is mainly applied in Layer 3 intra-domain handover. The specific process is as follows:

1. When the MN performs network access authentication for the first time, the MN and the home AAA (HAAA) server (that is, the AAA server on the home network of the MN) generate information for fast re-authentication, where the information may include an ID and a key dedicated for the fast re-authentication.

2. The HAAA server sends the fast re-authentication information to the visited AAA (VAAA) server (that is, the AAA server on the visited network where the MN is located).

3. When the MN enters the visited network, the MN provides the VAAA server with fast re-authentication information through a new network attachment point; the VAAA server re-authenticates the MN according to the fast re-authentication information sent from the HAAA server.

By using the fast re-authentication method, when the MN performs handover between the VAAA server and the HAAA server, the overheads of the VAAA server and the HAAA server on the link and the number of interactions between the VAAA server and the HAAA server are reduced. However, the fast re-authentication method requires a security relationship between the MN and the VAAA server. In an inter-domain handover scenario, no security relationship exists between the new VAAA server and the MN. Thus, the fast re-authentication method is not applicable to Layer 3 inter-domain handover.

During the implementation of the present application, the inventor discovers at least the following problems in the prior art:

When the MN performs inter-domain handover, the VAAA server after handover is required to perform authentication on the HAAA server, thus generating a long handover delay.

SUMMARY OF THE APPLICATION

To reduce the inter-domain handover delay, embodiments of the present application provide a pre-authentication method, an authentication system, and an authentication apparatus. A technical solution provided in these embodiments follows:

A pre-authentication method includes:

when an MN enters a visited network other than a home network, obtaining, by the MN, identity information of the visited network;

selecting, by the MN and according to the identity information of the visited network, a first pre-auth-key-file corresponding to the visited network and a first ticket corresponding to the visited network, where the first ticket carries the first pre-auth-key-file; and performing, by a VAAA server and the MN, mutual authentication according to the first pre-auth-key-file.

Another pre-authentication method includes:

when an MN enters a visited network other than a home network, obtaining, by the MN, identity information of the visited network;

generating, by the MN, a second pre-auth-key according to the identity information of the visited network; and performing, by the MN and a VAAA server, mutual authentication according to the second pre-auth-key.

An authentication system includes:

an MN, configured to: when entering a visited network other than a home network, obtain identity information of the visited network, select, according to the identity information of the visited network, a first pre-auth-key-file corresponding to the visited network and a first ticket corresponding to the visited network, where the first ticket carries the first pre-auth-key-file, and authenticate a VAAA server according to the pre-auth-key-file; and the VAAA server of the visited network, configured to authenticate the MN according to the first pre-auth-key-file.

An MN includes:

an obtaining module, configured to obtain identity information of a visited network when the MN enters the visited network other than a home network;

a selecting module, configured to select, according to the identity information that is obtained by the obtaining module and is about the visited network, a first pre-auth-key-file corresponding to the visited network and a first ticket corresponding to the visited network, where the first ticket carries the first pre-auth-key-file; and a first authenticating module, configured to authenticate a VAAA server according to the first pre-auth-key-file selected by the selecting module.

A VAAA server includes:

a key obtaining module, configured to obtain a first pre-auth-key-file from a first ticket after receiving first authentication information and the first ticket sent from an MN;

a second generating module, configured to generate second authentication information according to the first pre-auth-key-file obtained by the key obtaining module and according to a rule the same as that for generating the first authentication information by the MN;

a second judging unit, configured to: judge whether the second authentication information generated by the second generating unit is the same as the first authentication information sent from the MN; if the second authentication information generated by the second generating unit is the same as the first authentication information sent from the MN, indicating a successful authentication of the MN.

a third generating module, configured to generate third authentication information; and a third sending module, configured to send the third authentication information generated by the third generating module to the MN.

Another authentication system includes:

an MN, configured to: when entering a visited network other than a home network, obtain identity information of the visited network, generate a second pre-auth-key according to the identity information of the visited network, and authenticate a VAAA server according to the pre-auth-key; and the VAAA server, configured to authenticate the MN according to the second pre-auth-key.

Another MN includes:

an obtaining module, configured to obtain identity information of a visited network when the MN enters the visited network other than a home network;

a first generating module, configured to generate a second pre-auth-key according to the identity information that is obtained by the obtaining module and is about the visited network; and a first authenticating module, configured to authenticate a VAAA server according to the second pre-auth-key generated by the first generating module.

Another VAAA server includes:

a second generating module, configured to generate second authentication information according to a pre-auth-key sent from an HAAA server and according to a rule the same as that for generating first authentication information by an MN after receiving the first authentication information from the MN;

a second judging unit, configured to: judge whether the second authentication information generated by the second generating unit is the same as the first authentication information sent from the MN; if the second authentication information generated by the second generating unit is the same as the first authentication information sent from the MN, indicating a successful authentication of the MN.

a third generating module, configured to generate third authentication information; and a second sending module, configured to send the third authentication information generated by the third generating module to the MN.

The described embodiments have the advantage that when an MN enters a visited network other than the home network, the MN performs network access authentication with the VAAA server according to the obtained authentication information. In this way, the VAAA server does not need to perform the authentication on the HAAA server in the case of inter-domain handover, thus shortening the inter-domain handover delay.

DETAILED DESCRIPTION OF THE EMBODIMENTS

To make the technical solution more comprehensible, various exemplary embodiments are described in detail with reference to the accompanying drawings.

In the described embodiments, a trust relationship is established beforehand between the MN and the VAAA server, thus reducing the time needed for the new network access authentication.

Embodiment 1

In this embodiment, when the HAAA server performs access authentication on the MN, the HAAA server sends a ticket that may be used to access a visited network other than the home network to the MN, where the ticket includes a trust and related parameters that are issued by the HAAA server and used in the case of mutual authentication between the MN and the visited network. In this way, after the MN enters the visited network, the MN may perform the access authentication with the VAAA server through the ticket.

Figure 1A:
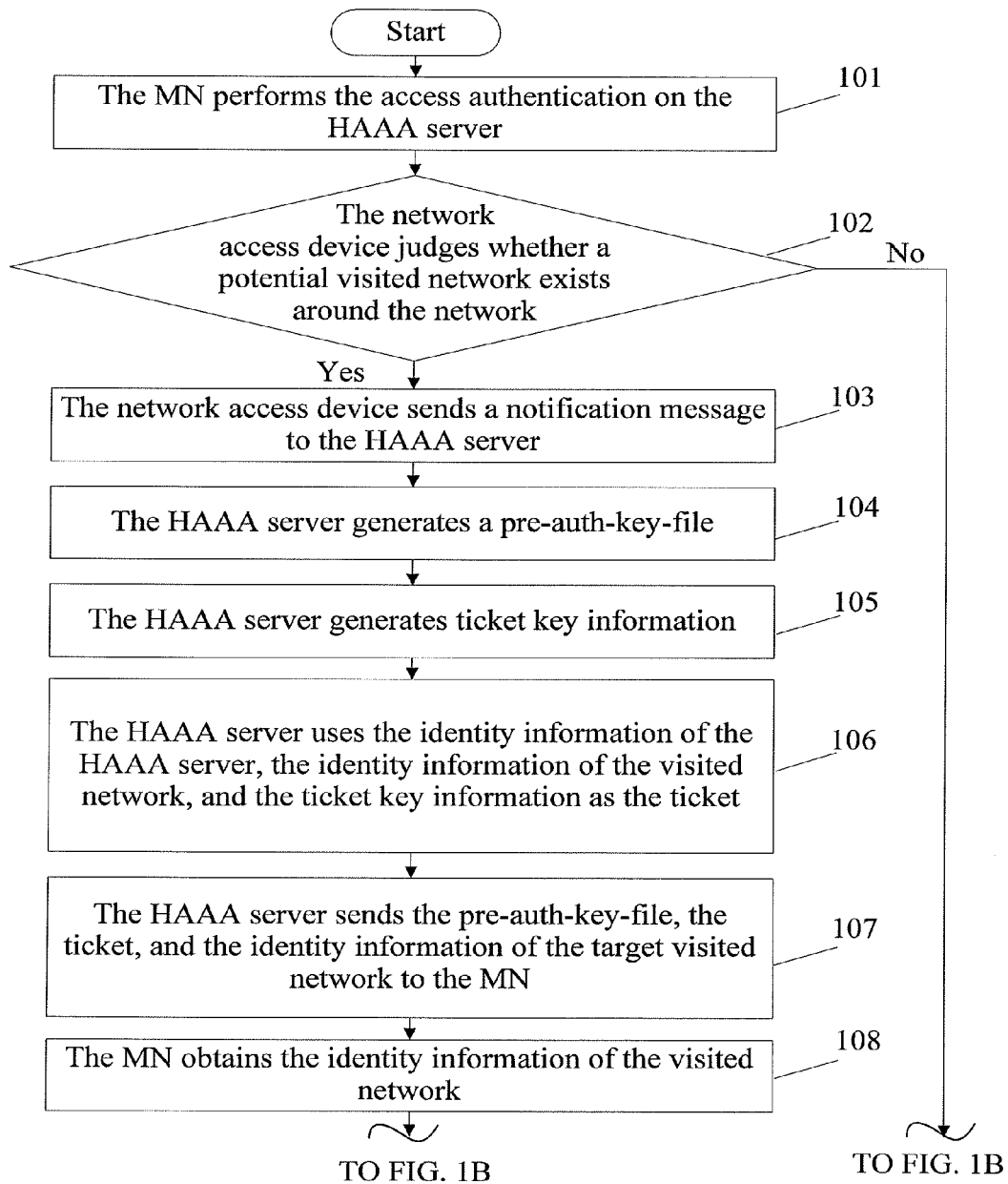
FIGS. 1A and 1B are a flowchart of a pre-authentication method according to a first embodiment.
Figure 1B:
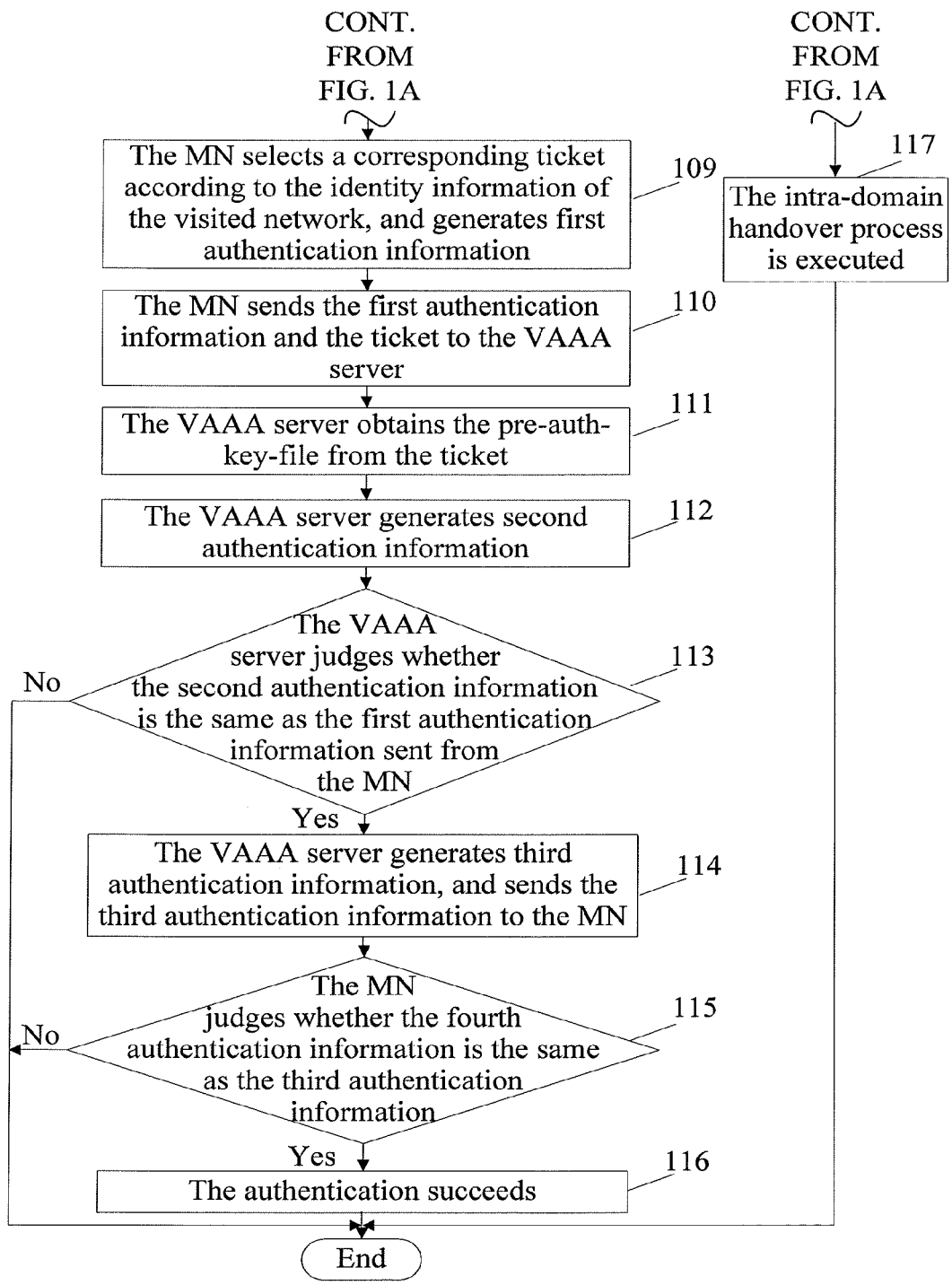

As shown in FIG. 1, a pre-authentication method provided in this embodiment includes the following steps:

Step 101: The MN accesses the initial network access device, and performs the access authentication with the HAAA server through the network access device.

When the network where the MN is located is the home network, the MN may directly perform the access authentication with the HAAA server. When the network where the MN is located is a visited network other than the home network, the MN may perform the authentication with the HAAA server through the VAAA server. The access authentication process is available in the prior art, and is not further described.

Further, in the access authentication process, the HAAA server may judge whether the MN supports fast pre-authentication according to the pre-stored AAA profile of the MN. If the MN supports fast pre-authentication according to the pre-stored AAA profile of the MN, the process proceeds to steps 102 to 113. The AAA profile is pre-stored in the HAAA server and includes ID, services and constraints (for example, whether the MN supports fast re-authentication) of the MN.

Step 102: The network access device on the network where the MN is located judges whether there is a potential visited network around the network (that is, whether there are other overlay networks). If there is a potential visited network around the network, the process proceeds to step 103; otherwise, the process proceeds to step 117.

The network access device may judge whether there is a potential visited network around the network according to lower layer technologies, for example, awareness of the neighboring signals and planning during the network deployment. This process is available in the prior art, and is not further described.

Step 103: The network access device sends a notification message to the HAAA server over the AAA Protocol, where the notification message carries the identity information of the potential visited network.

Step 104: After receiving the notification message sent from the network access device, the HAAA server generates a pre-auth-key-file. For example, the HAAA server may freely select a group of data that complies with the key requirement of the encryption algorithm as the pre-auth-key-file.

After the HAAA server receives the notification message sent from the network access device, this step further includes the following:

The HAAA server judges whether a security relationship exists between the home network and the visited network according to the identity information of the potential visited network carried in the notification message; if a security relationship exists between the home network and the visited network, the HAAA server generates a pre-auth-key-file; otherwise, the home network cannot interact with the visited network.

Step 105: The HAAA server extracts the identity information of the potential visited network, and encrypts the pre-auth-key-file and related parameters into ticket key information according to the security relationship between the home network and each visited network.

The security relationship between the home network and the potential visited network may be a pre-shared key between the home network and the potential visited network or a public/private key pair of the potential visited network. In this embodiment, the Kh-t is used for indicating the pre-shared key between the home network and the potential visited network or the public/private key pair of the potential visited network.

Besides the pre-auth-key-file, the preceding parameters used for generating the ticket key information include at least the following information: HAAA label, Target VAAA label, MN-ID, MN profile, and lifetime. The following describes the meanings of the information: The HAAA label and the Target VAAA label indicate identity information of the home network and the visited network respectively; the MN-ID indicates the identifier of the MN; the MN profile indicates the basic information and services of the MN; the lifetime indicates the valid period of the ticket. The ticket key information generated by encrypting the pre-auth-key-file and related parameters according to the Kh-t is represented as follows:

Kh-t (pre-auth-key-file, HAAA label, Target VAAA label, MN-ID, MN profile, lifetime)

Step 106: The HAAA server uses the identity information of the HAAA server, the identity information of the potential visited network, and corresponding ticket key information as the ticket of the MN entering networks other than the home network. That is, Ticket={HAAA label, Target VAAA label, Kh-t (pre-auth-key-file, HAAA label, Target VAAA label, MN-ID, MN profile, lifetime)}.

Step 107: The HAAA server sends the pre-auth-key-file, the ticket, and the potential VAAA label to the MN.

Further, to ensure the security of the preceding information, the HAAA server may encrypt the pre-auth-key-file, the ticket, and the potential VAAA label by using the key between the HAAA server and the MN, and then send the encrypted data to the MN.

Step 108: When the MN enters a visited network other than the home network, the MN obtains the identity information of the visited network.

The MN may obtain the identity information of the visited network from the media access control (MAC) message broadcasted by the network device on the newly visited network. This process is available in the prior art, and is not further described.

Step 109: The MN selects a corresponding ticket according to the identity information of the visited network, and generates first authentication information according to the pre-auth-key-file.

The MN may perform operations on the selected parameters to generate first authentication information according to the pre-auth-key-file, where the parameters may be a group of data selected at random.

Step 110: The MN sends the generated first authentication information and the selected ticket to the VAAA server.

Further, after sending the first authentication information and the ticket to the VAAA server, the MN may send the parameters for generating the first authentication information to the VAAA server.

Step 111: After receiving the ticket sent from the MN, the VAAA server obtains the pre-auth-key-file from the ticket.

The following describes a specific process of obtaining the pre-auth-key-file from the ticket:

Select a key according to the HAAA label in the ticket to decrypt the ticket key information in the ticket into the pre-auth-key-file.

Step 112: The VAAA server generates second authentication information according to a rule the same as that for generating the first authentication information by the MN and according to the pre-auth-key-file.

Step 113: The VAAA server judges whether the generated second authentication information is the same as the first authentication information sent from the MN; if the generated second authentication information is the same as the first authentication information sent from the MN, it indicates that the VAAA server authenticates the MN successfully, and the process proceeds to step 114; otherwise, the process ends.

Step 114: The VAAA server generates third authentication information, and sends the third authentication information to the MN.

The process of generating the third authentication information by the VAAA server is similar to the process of generating the first authentication information by the MN, that is, performing operations on the selected parameters according to the pre-auth-key-file to generate third authentication information, where the parameters may be a group of data selected at random. The VAAA server may also send the selected parameters to the MN while sending the third authentication information.

Step 115: After receiving the third authentication information sent from the VAAA server, the MN generates fourth authentication information according to a rule the same as that for generating the third authentication information by the VAAA server, and judges whether the fourth authentication information is the same as the third authentication information; if the fourth authentication information is the same as the third authentication information, it indicates that the MN authenticates the VAAA server successfully, and the process proceeds to step 116; otherwise, the process ends.

Step 116: The authentication succeeds. The MN may continue to interact with the VAAA server.

Step 117: The intra-domain handover process is executed. This process is available in the prior art, and is not further described.

In this embodiment, steps 102 to 107 occur in the process of performing Extensible Authentication Protocol (EAP) authentication on the HAAA server by the MN, and may be executed before or after step 101. For better description, these steps are placed after step 101.

In the first embodiment, when the MN performs initial network access authentication, the HAAA server sends a pre-auth-key-file and a ticket including the pre-auth-key-file to the MN; when the MN authenticates a visited network other than the home network, the MN sends the pre-auth-key-file and ticket to the VAAA server; the VAAA server performs network access authentication on the MN according to the ticket. In this way, the authentication on the HAAA server is not required, thus reducing the overheads on the link between the VAAA server and the HAAA server and the inter-domain delay.

Embodiment 2

Figure 2A:
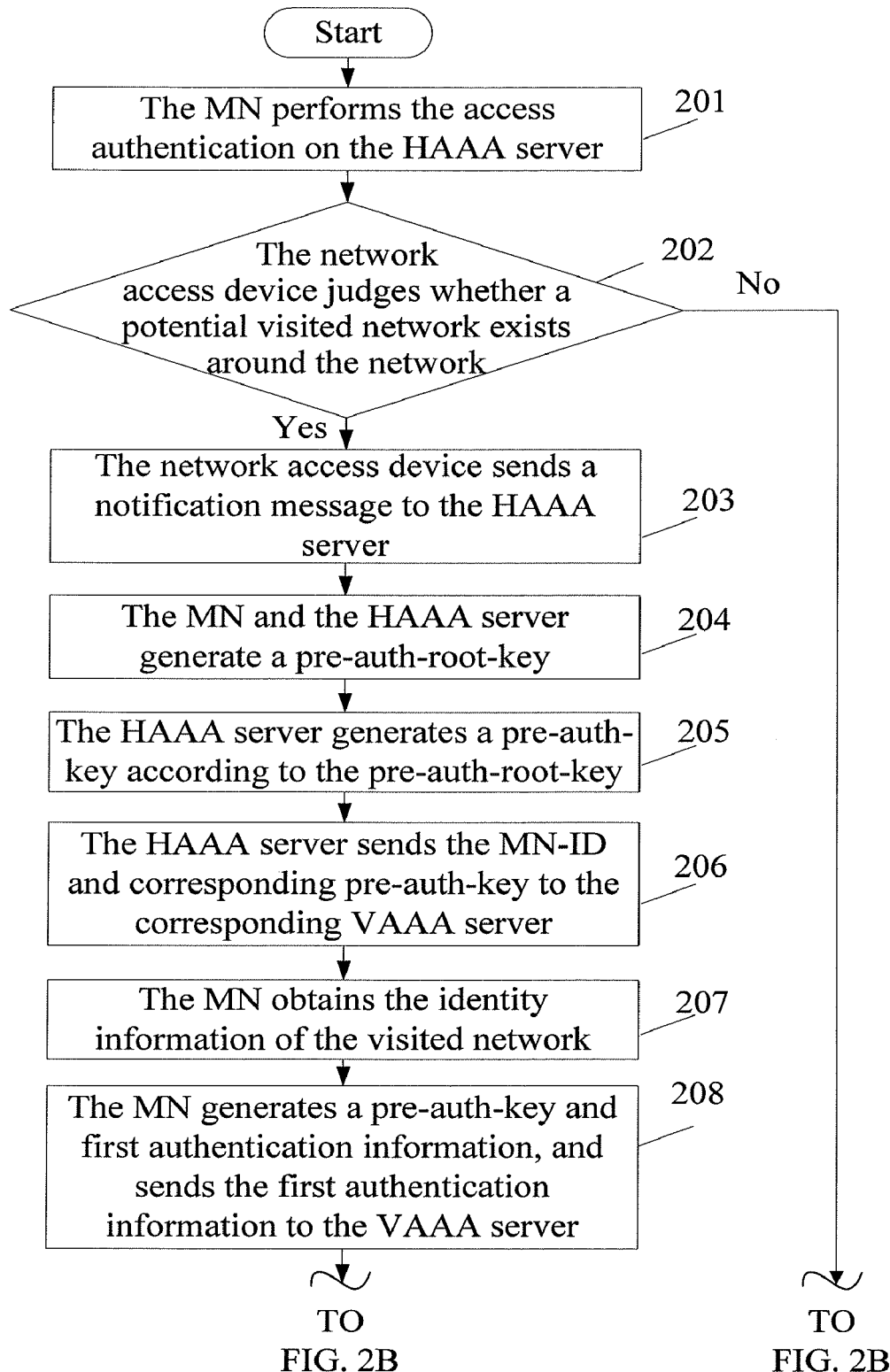
FIGS. 2A and 2B are a flowchart of another pre-authentication method according to a second embodiment.
Figure 2B:
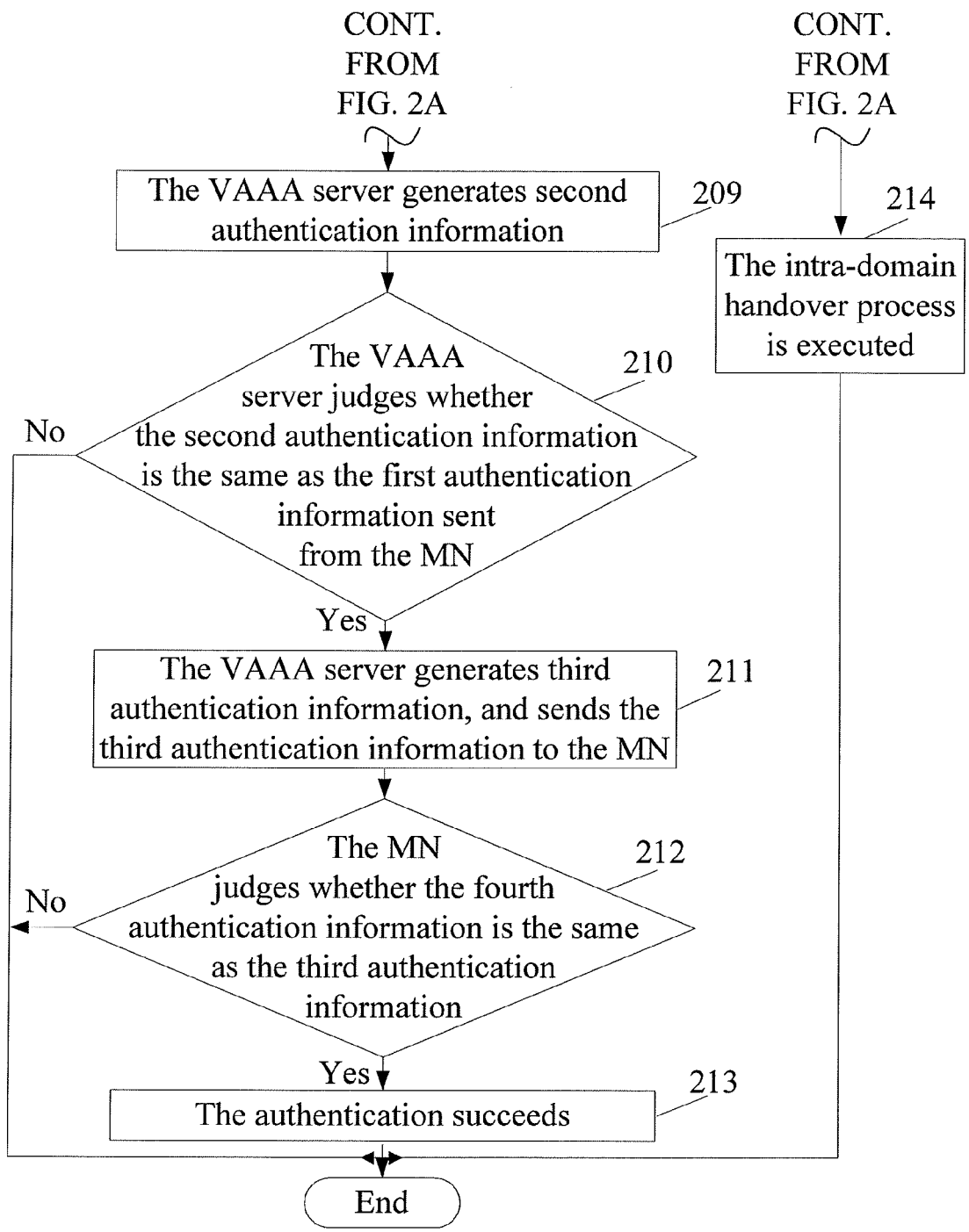

In this embodiment, after the HAAA server completes the EAP authentication on the MN, the HAAA server and the MN generate a pre-auth-root-key according to the AAA key generated during the authentication. Then, the HAAA server generates a pre-auth-key according to the pre-auth-root-key, and sends the pre-auth-key to the potential VAAA server. When the MN enters a visited network other than the home network, the MN generates a pre-auth-key according to the pre-auth-root-key, and then performs access authentication with the VAAA server according to the pre-auth-key. As shown in FIG. 2, another pre-authentication method provided in this embodiment includes the following steps:

Step 201: The MN accesses the initial network access device, and performs the access authentication with the HAAA server through the network access device.

The process of performing the access authentication by the MN is the same as that in the first embodiment, and is not further described.

Step 202: The network access device on the network where the MN is located judges whether there is a potential visited network around the network; if there is a potential visited network around the network, the process proceeds to step 203; otherwise, the process proceeds to step 214.

Step 203: The network access device sends a notification message to the HAAA server over the AAA protocol, where the notification message carries the identity information of the potential visited network.

Step 204: After the access authentication is completed, the MN and the HAAA server generate a pre-auth-root-key according to the AAA key, HAAA label, and MN-ID.

The AAA key refers to the EMSK and its child key generated by the HAAA server according to the pre-shared key between the MN and the AAA server during the access authentication. The generated pre-auth-root-key is as follows:

pre-auth-root-key=prf (MN-ID, HAAA label, AAA key), where prf refers to the key generation function.

Step 205: The HAAA server generates a pre-auth-key according to the potential VAAA label carried in the notification message sent from the network access device and the pre-auth-root-key, that is, pre-auth-key=prf (pre-auth-root-key, Target VAAA label).

Step 206: The HAAA server sends the MN-ID and corresponding pre-auth-key to the corresponding VAAA server.

Step 207: When the MN enters a visited network other than the home network, the MN obtains the potential VAAA label.

Step 208: The MN generates a pre-auth-key according to the potential VAAA label and the pre-auth-root-key, generates first authentication information according to the pre-auth-key, and sends the generated first authentication information to the VAAA server.

The method for generating the first authentication information by the MN according to the pre-auth-key is the same as that in the first embodiment, and is not further described. In addition, after sending the pre-auth-key and the first authentication information to the VAAA server, the MN may send the parameters for generating the first authentication information to the VAAA server.

Step 209: After receiving the first authentication information sent from the MN, the VAAA server generates second authentication information according to a rule the same as that for generating the first authentication information and according to the pre-auth-key sent from the HAAA server and the parameters for generating the first authentication information sent from the MN.

Step 210: The VAAA server judges whether the generated second authentication information is the same as the first authentication information sent from the MN; if the generated second authentication information is the same as the first authentication information sent from the MN, it indicates that the VAAA server authenticates the MN successfully, and the process proceeds to step 211; otherwise, the process ends.

Step 211: The VAAA server generates third authentication information, and sends the third authentication information to the MN.

Step 212: After receiving the third authentication information sent from the VAAA server, the MN generates fourth authentication information according to a rule the same as that for generating the third authentication information by the VAAA server, and judges whether the fourth authentication information generated by the MN is the same as the third authentication information; if the fourth authentication information generated by the MN is the same as the third authentication information, it indicates that the MN authenticates the VAAA server successfully, and the process proceeds to step 213; otherwise, the process ends.

Step 213: The authentication succeeds. The MN may continue to interact with the potential VAAA server.

Step 214: The intra-domain handover process is executed. This process is available in the prior art, and is not further described.

In this embodiment, steps 202 to 203 occur in the process of performing EAP authentication on the HAAA server by the MN, and may be executed before or after step 201. For better description, step 202 and step 203 are placed after step 201.

In this embodiment, the HAAA server sends the pre-auth-key of the MN to the VAAA server on a visited network other than the home network firstly; after the MN enters the visited network, the VAAA server performs access authentication on the MN according to the received pre-auth-key. In this way, the MN may perform the network access authentication on the VAAA server when it enters a visited network other than the home network, making it unnecessary to perform authentication on the HAAA server, reducing the overheads on the link from the VAAA server to the HAAA server, and shortening the handover delay.

Embodiment 3

Figure 3:
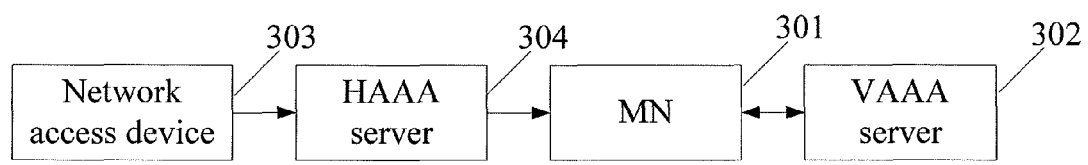
FIG. 3 is a schematic diagram illustrating the structure of an authentication system according to a third embodiment.

As shown in FIG. 3, an authentication system provided in the third embodiment includes an MN 301 and a VAAA server 302.

The MN 301 is configured to: when entering a visited network other than the home network, obtain the identity information of the visited network, select, according to the identity information of the visited network, a first pre-auth-key-file corresponding to the visited network and a first ticket corresponding to the visited network, where the first ticket carries the first pre-auth-key-file; and authenticate the VAAA server 302 according to the pre-auth-key-file.

The VAAA server 302 is configured to authenticate the MN 301 according to the first pre-auth-key-file.

Figure 4:
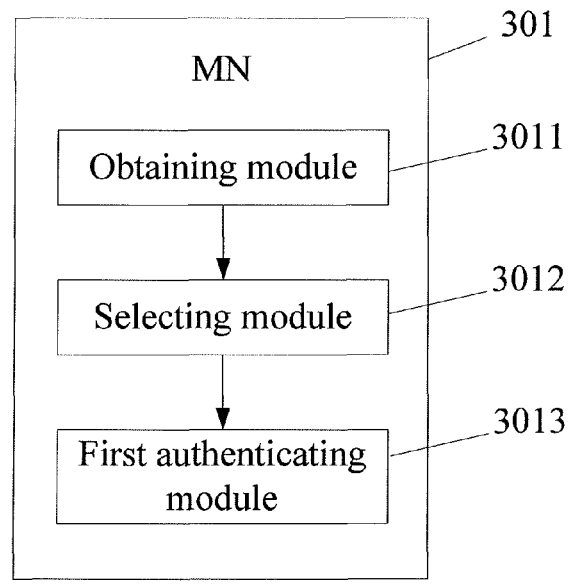
FIG. 4 is a schematic diagram illustrating the structure of an MN in the authentication system according to the third embodiment.

As shown in FIG. 4, the MN 301 may include:

an obtaining module 3011, configured to obtain the identity information of the visited network when the MN 301 enters the visited network other than the home network;

a selecting module 3012, configured to select, according to the identity information that is obtained by the obtaining module 3011 and is about the visited network, a first pre-auth-key-file corresponding to the visited network and a first ticket corresponding to the visited network, where the first ticket carries the first pre-auth-key-file; and a first authenticating module 3013, configured to authenticate the VAAA server 302 according to the pre-auth-key-file selected by the selecting module 3012.

Further, the preceding first authenticating module 3013 may include:

a first generating unit, configured to generate first authentication information according to the first pre-auth-key-file selected by the selecting module 3012;

a first sending unit, configured to send the first authentication information generated by the first generating unit and the first ticket selected by the selecting module 3012 to the VAAA server 302;

a fourth generating unit, configured to generate fourth authentication information according to a rule the same as that for generating the third authentication information by the VAAA server 302 after receiving the third authentication information; and a first judging unit, configured to: judge whether the fourth authentication information generated by the fourth generating unit is the same as the third authentication information; if the fourth authentication information generated by the fourth generating unit is the same as the third authentication information, the MN 301 authenticates the VAAA server 302 successfully.

Figure 5:
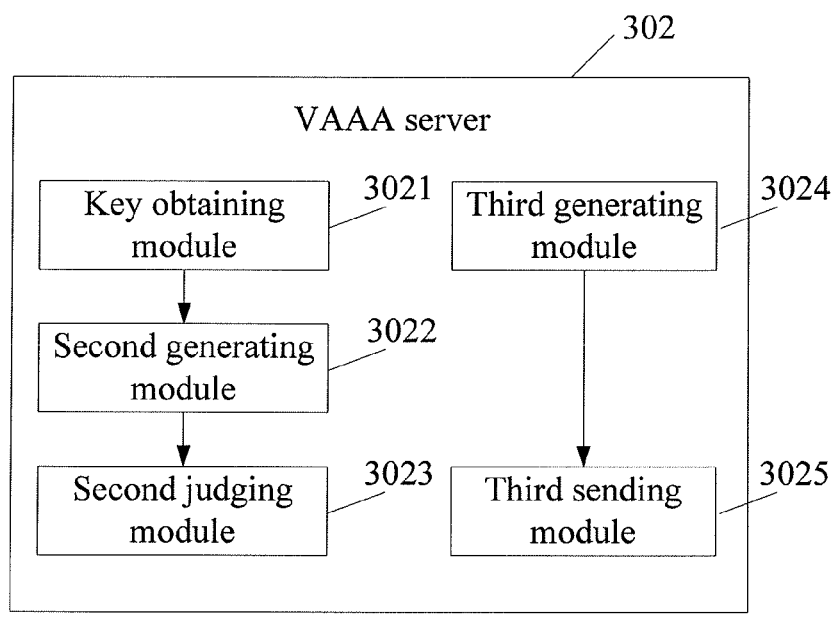
FIG. 5 is a schematic diagram illustrating the structure of a VAAA server in the authentication system according to the third embodiment.

As shown in FIG. 5, the preceding VAAA server 302 may include:

a key obtaining module 3021, configured to obtain the first pre-auth-key-file from the first ticket after receiving the first authentication information and the first ticket sent from the MN 301;

a second generating module 3022, configured to generate second authentication information according to the first pre-auth-key-file obtained by the key obtaining module 3021 and according to a rule the same as that for generating the first authentication information by the MN 301;

a second judging unit 3023, configured to: judge whether the second authentication information generated by the second generating unit 3022 is the same as the first authentication information sent from the MN 301; if the second authentication information generated by the second generating unit 3022 is the same as the first authentication information sent from the MN 301, the VAAA server 302 authenticates the MN 301 successfully;

a third generating module 3024, configured to generate third authentication information; and a third sending module 3025, configured to send the third authentication information generated by the third generating module 3024 to the MN 301.

Further, the preceding authentication system further includes a network access device 303 and an HAAA server 304.

The network access device 303 is configured to: before the MN 301 enters the visited network, judge whether a potential visited network exists around the network where the MN 301 is located; if a potential visited network exists around the network where the MN 301 is located, send the identity information of the potential visited network to the HAAA server 304.

The HAAA server 304 is configured to: after receiving the identity information of the potential visited network sent from the network access device 303, generate a pre-auth-key-file, encrypt the pre-auth-key-file and related parameters according to the security relationship between the home network and the visited network to generate ticket key information, use the identity information of the HAAA server 304, the identity information of the potential visited network, and the ticket key information as a ticket, and send the pre-auth-key-file, the ticket, and the identity information of the potential visited network to the MN 301.

Because there may be multiple potential visited networks, the pre-auth-key-file that the HAAA server 304 generates after receiving the identity information of the potential visited network from the network access device 303 may include pre-auth-key-files of multiple potential visited networks. However, the first pre-auth-key-file in this embodiment is only the pre-auth-key-file of one potential visited network.

Accordingly, the ticket key information generated by encrypting the pre-auth-key-file and related parameters according to the security relationship between the home network and the visited network may also include ticket key information of multiple potential visited networks. The ticket that includes the identity information of the HAAA server 304, the identity information of the visited network, and the ticket key information may also include tickets of multiple potential visited networks. In this embodiment, the ticket is only the ticket of one visited network.

In this embodiment, when the MN performs the initial network access authentication, the HAAA server sends a pre-auth-key-file and a ticket including the pre-auth-key-file to the MN, so that the MN may directly perform the network access authentication on the VAAA server when it enters a visited network other than the home network, making it unnecessary to perform the authentication on the HAAA server, reducing the overheads on the link from the VAAA server to the HAAA server, and shortening the handover delay.

Embodiment 4

Figure 6:
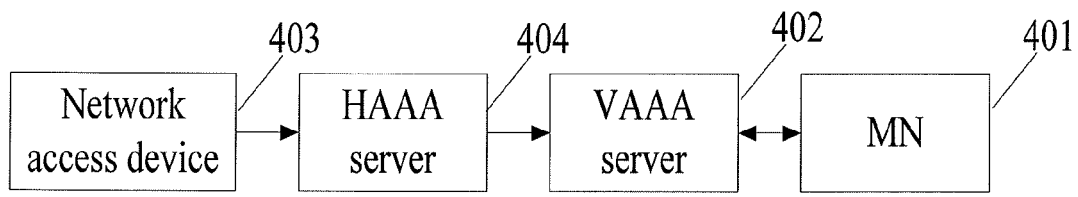
FIG. 6 is a schematic diagram illustrating the a structure of an authentication system according to a fourth embodiment.

As shown in FIG. 6, an authentication system provided in the fourth embodiment includes an MN 401 and a VAAA server 402.

The MN 401 is configured to: when entering a visited network other than the home network, obtain the identity information of the visited network, generate second pre-auth-key according to the identity information of the visited network, and authenticate the VAAA server 402 according to the second pre-auth-key.

The VAAA server 402 is configured to authenticate the MN 401 according to the second pre-auth-key.

Figure 7:
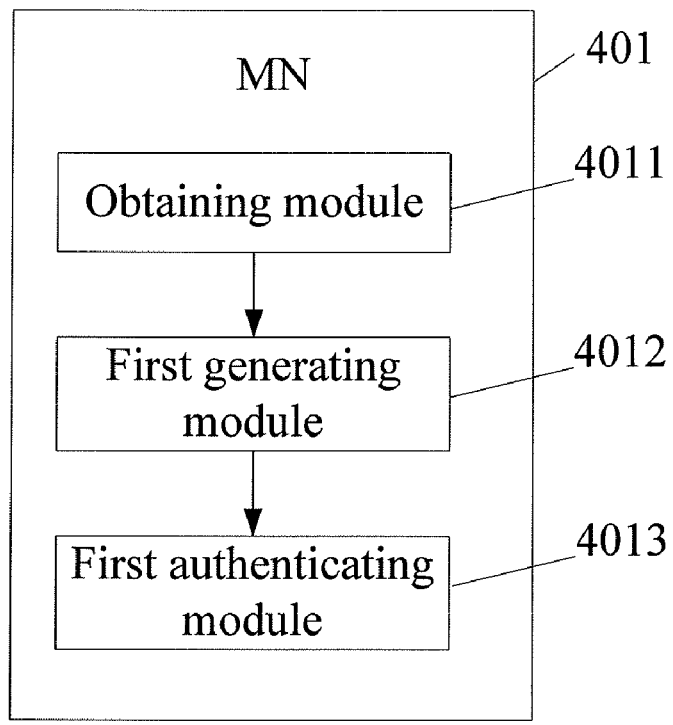
FIG. 7 is a schematic diagram illustrating the structure of an MN in the authentication system according to the fourth embodiment.

As shown in FIG. 7, the MN 401 may include:

an obtaining module 4011, configured to obtain the identity information of the visited network when the MN 401 enters the visited network other than the home network;

a first generating module 4012, configured to generate a second pre-auth-key according to the identity information that is obtained by the obtaining module 4011 and is about the visited network; and a first authenticating module 4013, configured to authenticate the VAAA server 402 according to the second pre-auth-key generated by the first generating module 4012.

Further, the preceding first authenticating module 4013 may include:

a first generating unit, configured to generate first authentication information according to the second pre-auth-key generated by the first generating module;

a first sending unit, configured to send the first authentication information generated by the first generating module to the VAAA server 402;

a fourth generating unit, configured to generate fourth authentication information according to a rule the same as that for generating the third authentication information by the VAAA server 402 after receiving the third authentication information; and a first judging unit, configured to: judge whether the fourth authentication information generated by the fourth generating unit is the same as the third authentication information; if the fourth authentication information generated by the fourth generating unit is the same as the third authentication information, the MN 401 authenticates the VAAA server 402 successfully.

Figure 8:
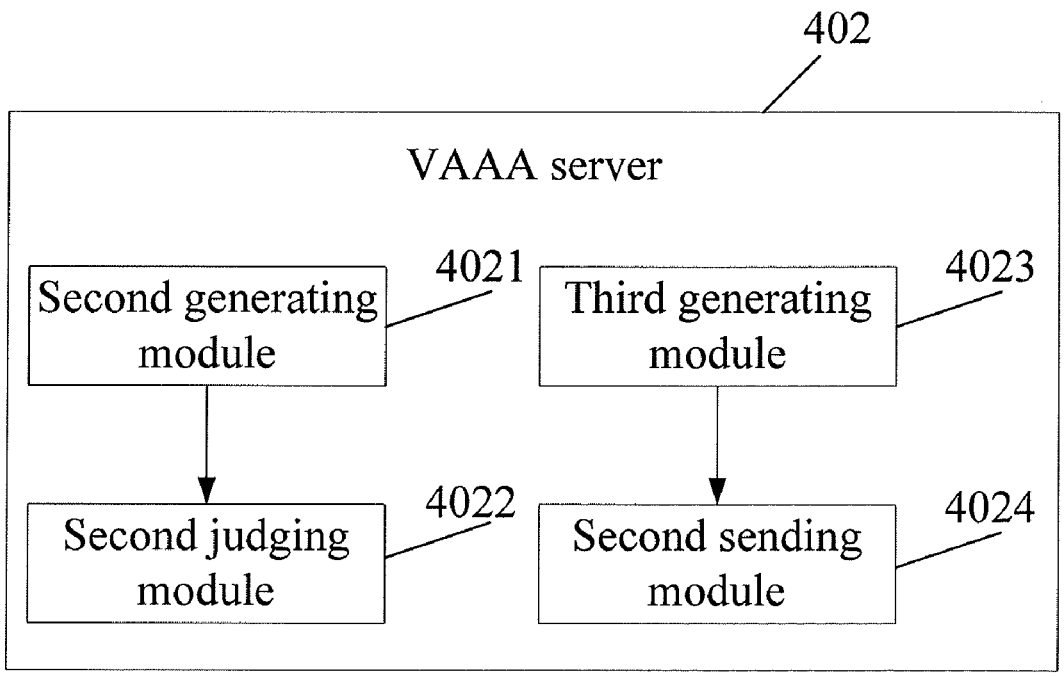
FIG. 8 is a schematic diagram illustrating the structure of a VAAA server in the authentication system according to the fourth embodiment.

As shown in FIG. 8, the preceding VAAA server 402 may include: a second generating module 4021, a second judging unit 4022, a third generating module 4023, and a second sending module 4024.

The second generating module 4021 is configured to generate second authentication information according to a pre-auth-key sent from the HAAA server 404 and according to a rule the same as that for generating the first authentication information by the MN 401 after receiving first authentication information from the MN.

Before the MN 401 enters a visited network other than the home network, the HAAA server 404 sends a pre-auth-key to the VAAA server 402, where the pre-auth-key includes pre-auth-keys of all the potential visited networks around the network where the MN 401 is located. After receiving the first authentication information sent from the MN, the second generating module 4021 of the VAAA server 402 selects a corresponding pre-auth-key from the pre-authentication keys sent from the HAAA server 404, and then generates second authentication information according to the selected pre-auth-key and according to a rule the same as that for generating the first authentication information by the MN 401.

The second judging unit 4022 is configured to: judge whether the second authentication information generated by the second generating unit 4021 is the same as the first authentication information sent from the MN 401; if the second authentication information generated by the second generating unit 4021 is the same as the first authentication information sent from the MN 401, the VAAA server 402 authenticates the MN 401 successfully.

The third generating module 4023 is configured to generate third authentication information.

The second sending module 4024 is configured to send the third authentication information generated by the third generating module 4023 to the MN 401.

Further, the preceding authentication system further includes a network access device 403 and an HAAA server 404.

The network access device 403 is configured to: before the MN 401 enters the visited network, judge whether a potential visited network exists around the network where the MN 401 is located; if a potential visited network exists around the network where the MN 401 is located, send the identity information of the potential visited network to the HAAA server 404.

The HAAA server 404 is configured to: after receiving the identity information of the potential visited network sent from the network access device 403, generate a pre-auth-root-key according to the ID of the MN 401, the identity information of the HAAA server 404, and the AAA key, where the AAA key is a key file generated when the HAAA server 404 performs EAP authentication on the MN 401; generate a pre-auth-key according to the identity information of the potential visited network sent from the network access device 403 and the pre-auth-root-key; and send the pre-auth-key to the VAAA server 402. Because there may be multiple potential visited networks, the pre-auth-root-key that the HAAA server 404 generates after receiving the identity information of the potential visited network sent from the network access device 403 may include pre-auth-root-keys of multiple potential visited networks. However, the pre-auth-key generated according to the identity information of the potential visited network sent from the network access device 403 and the pre-auth-root-key may include pre-auth-keys of multiple potential visited networks. The second pre-auth-key in this embodiment is only the pre-auth-key of one visited network.

Accordingly, the MN 401 is further configured to generate a pre-auth-root-key according to the ID of the MN 401, the identity information of the HAAA server 404, and the AAA key after entering the visited network.

In the described embodiments, the HAAA server firstly sends a pre-authentication key to the VAAA server of a visited network other than the home network through the HAAA server; after the MN enters the visited network, the VAAA server performs access authentication on the MN according to the received pre-auth-key. In this way, when the MN enters a visited network other than the home network, the MN may directly perform the network access authentication on the VAAA server, thus making it unnecessary to perform the authentication on the HAAA server, reducing the overheads on the link from the VAAA server to the HAAA server, and shortening the handover delay.

The embodiments may be implemented by using software. The software may be stored in a readable storage medium, such as a hard disk, a floppy disk or a compact disk-read only memory (CD-ROM) in a personal computer.

Although various exemplary embodiments are described, the claims are not so limited. Modifications, equivalent replacements, and/or improvements may be made to these embodiments without departing from the scope of the claims.

What is claimed is:

1. A pre-authentication method for authenticating a mobile node (MN) when the mobile node (MN) enters a visited network other than a home network, comprising:
   obtaining by the MN, identity information of the visited network;
   generating by the MN, a pre-auth-key according to the identity information of the visited network; and
   performing by the MN and a visited authentication, authorization and accounting (VAAA) server, mutual authentication according to the pre-auth-key, wherein before the MN entering the visited network, judging by a network access device on a network where the MN is located, whether a potential visited network exists around the network;
     if the potential visited network exists around the network, sending identity information of the potential visited network to the HAAA server, wherein after receiving the identity information of the potential visited network by the HAAA server, generating a pre-auth-root-key according to an MN ID, the identity information of the HAAA server and an AAA key, wherein the AAA key refers to a key file generated when the HAAA server performs Extensible Authentication Protocol (EAP) authentication on the MN;
     generating a pre-auth-key according to the identity information of the potential visited network and the pre-auth-root-key,
     sending the pre-auth-key to the VAAA server;
     generating by the MN, a pre-auth-root-key according to the MN ID, the identity information of the HAAA server and the AAA key; before entering the visited network;
     obtaining the identity information of the visited network; and
     generating a pre-auth-key according to the identity information of the visited network and the pre-auth-root-key.

2. The pre-authentication method of claim 1, wherein the performing of mutual authentication by the MN and the VAAA server according to a pre-auth-key-file, comprising:
   generating by the MN, first authentication information according to the pre-auth-key, and sending the first authentication information to the VAAA server;
   after receiving the first authentication information, generating by the VAAA server, second authentication information according to a pre-auth-key sent from a home authentication, authorization and accounting (HAAA) server and according to a same rule which is for generating the first authentication information by the MN;
   judging whether the second authentication information matches the first authentication information sent from the MN;
   if the second authentication information matches the first authentication information sent from the MN, indicating a successful authentication of the MN;
   generating by the VAAA server, third authentication information, and sending the third authentication information to the MN; and
   after receiving the third authentication information, generating by the MN, fourth authentication information according to a same rule which is for generating the third authentication information by the VAAA server;
   judging whether the third authentication information matches the fourth authentication information; and
   if the third authentication information is the same as the fourth authentication information, indicating a successful authentication of the VAAA server.

3. A pre-authentication method for authenticating a mobile node (MN) when the mobile node (MN) enters a visited network other than a home network, comprising:
   obtaining by the MN, identity information of the visited network;
   selecting by the MN and according to the identity information of the visited network, a first pre-auth-key-file corresponding to the visited network and a first ticket corresponding to the visited network, wherein the first ticket carries the first pre-auth-key-file; and
   performing by a visited authentication, authorization and accounting (VAAA) server and the MN, mutual authentication according to the first pre-auth-key-file; wherein before the MN enters the visited network, judging by a network access device on a network where the MN is located, whether a potential visited network exists around the network;
   if the potential visited network exists around the network, sending identity information of the potential visited network to a home authentication, authorization and accounting (HAAA) server;
   after receiving the identity information of the potential visited network, generating a pre-auth-key-file by the HAAA server;
   encrypting the pre-auth-key-file and related parameters according to a security relationship between the home network and the potential visited network to generate ticket key information based on: the identity information of the HAAA server, the identity information of the potential visited network, and the ticket key information as a ticket;
   sending the pre-auth-key-file, the ticket, and the identity information of the potential visited network to the MN;
   wherein selecting according to the identity information of the visited network, the first pre-auth-key-file corresponding to the visited network and the first ticket corresponding to the visited network by the MN comprises:
   selecting by the MN and according to the identity information of the visited network, the first pre-auth-key-file from the pre-auth-key-file; and
   selecting by the MN and according to the identity information of the visited network, the first ticket corresponding to the visited network from the ticket.

4. The pre-authentication method of claim 3, wherein the performing of mutual authentication by the VAAA server and the MN according to the first pre-auth-key-file comprising:
   generating by the MN, first authentication information according to the first pre-auth-key-file;
   sending the first authentication information and the first ticket to the VAAA server;
   after receiving the first authentication information and the first ticket, obtaining by the VAAA server, the first pre-auth-key-file from the first ticket;

generating second authentication information according to the first pre-auth-key-file and according to a same rule which is for generating the first authentication information;

judging whether the second authentication information is the same as the first authentication information;

if the second authentication information is the same as the first authentication information, indicating a successful authentication of the MN;

generating by the VAAA server, third authentication information, and sending the third authentication information to the MN; and after receiving the third authentication information, generating by the MN, fourth authentication information according to a same rule which is for generating the third authentication information by the VAAA server;

judging whether the third authentication information is the same as the fourth authentication information; and if the third authentication information is the same as the fourth authentication information, indicating a successful authentication of the VAAA server.

5. The pre-authentication method of claim 3, wherein the related parameters include one or more parameters from a list of parameters comprising: HAAA label, potential VAAA label, MN-ID, MN profile, and lifetime of the ticket.

6. The pre-authentication method of claim 3, wherein obtaining the first pre-auth-key-file from the first ticket comprising:

decrypting by the VAAA server, the ticket key information of the first ticket according to the security relationship between the home network and the visited network to obtain the first pre-auth-key-file.

7. The pre-authentication method of claim 3, wherein the security relationship refers to a pre-shared key between the home network and the visited network or a public/private key pair of the visited network.

* * * * *